(12) United States Patent
Martin et al.

(10) Patent No.: US 11,657,616 B2
(45) Date of Patent: May 23, 2023

(54) SPACE MANAGEMENT MONITORING AND REPORTING USING VIDEO ANALYTICS

(71) Applicant: JOHNSON CONTROLS TYCO IP HOLDINGS LLP, Milwaukee, WI (US)

(72) Inventors: Walter A. Martin, Antrim (GB); Gary McCaughan, Belfast (GB); Ashish Italiya, Newtownabbey (GB)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 8 days.

(21) Appl. No.: 16/606,499

(22) PCT Filed: May 1, 2018

(86) PCT No.: PCT/US2018/030405
§ 371 (c)(1),
(2) Date: Oct. 18, 2019

(87) PCT Pub. No.: WO2018/204332
PCT Pub. Date: Nov. 8, 2018

(65) Prior Publication Data
US 2021/0117693 A1    Apr. 22, 2021

Related U.S. Application Data

(60) Provisional application No. 62/492,426, filed on May 1, 2017.

(51) Int. Cl.
*G06V 20/52* (2022.01)
*G06T 7/246* (2017.01)
*G05B 15/02* (2006.01)

(52) U.S. Cl.
CPC ............. *G06V 20/53* (2022.01); *G05B 15/02* (2013.01); *G06T 7/246* (2017.01);
(Continued)

(58) Field of Classification Search
CPC ............. G06K 9/00778; G06K 9/00771; G06T 7/246; G06T 2207/10016;
(Continued)

(56) References Cited

U.S. PATENT DOCUMENTS 6,400,307 B2 *   6/2002   Fullerton ................. G01S 13/04
                                                              342/21
10,013,773 B1 *   7/2018   Ogale ........................ G06T 7/73
(Continued)

FOREIGN PATENT DOCUMENTS

WO    WO 2013/013082 A1    1/2013

OTHER PUBLICATIONS

International Search Report and Written Opinion of the International Searching Authority, dated Aug. 14, 2018, from International Application No. PCT/US2018/030405, filed on May 1, 2018. 16 pages.

(Continued)

*Primary Examiner* — Amara Abdi
(74) *Attorney, Agent, or Firm* — ArentFox Schiff LLP

(57) ABSTRACT

A system and method for space management monitoring and reporting using video analytics are disclosed. Such a building occupancy monitoring system monitors building resources that include rooms, areas such as work areas, and chairs and desks in the rooms, in examples. These building resources are monitored to determine whether the resources are being used by individuals, and for how long. In more detail, the system includes an image analytics module that tracks individuals in image data from surveillance cameras, relative to the building resources. The system also includes (Continued)

an occupancy report module that generates occupancy information including building resources that are used/unused by the individuals. The occupancy information is then used to program building control systems. Dwell maps and motion maps generated by the system, based on the occupancy information, can also be used to guide individuals to available building resources in a 'hot desking' environment.

23 Claims, 9 Drawing Sheets

(52) U.S. Cl.
CPC ............... *G06T 2207/10016* (2013.01); *G06T 2207/20081* (2013.01); *G06T 2207/30196* (2013.01); *G06T 2207/30232* (2013.01)

(58) Field of Classification Search
CPC . G06T 2207/20081; G06T 2207/30196; G06T 2207/30232; G05B 15/02; F24F 2120/10; F24F 11/46
See application file for complete search history.

(56) References Cited

U.S. PATENT DOCUMENTS

| | | | | |
|---|---|---|---|---|
| 2006/0063523 | A1* | 3/2006 | McFarland | G08C 17/02 455/423 |
| 2007/0127774 | A1* | 6/2007 | Zhang | G08B 13/19602 382/103 |
| 2007/0257937 | A1* | 11/2007 | Rye | G06T 11/00 345/617 |
| 2010/0235004 | A1* | 9/2010 | Thind | G05B 15/02 700/277 |
| 2011/0228984 | A1* | 9/2011 | Papke | G06V 20/52 382/103 |
| 2013/0085614 | A1* | 4/2013 | Wenzel | G05B 13/021 700/277 |
| 2014/0163703 | A1* | 6/2014 | Chang | G08B 13/1961 700/90 |
| 2016/0196728 | A1* | 7/2016 | Suman | G06V 20/52 382/103 |
| 2017/0323319 | A1* | 11/2017 | Rattner | G06N 20/00 |
| 2018/0137369 | A1* | 5/2018 | Roth | G06V 40/10 |

OTHER PUBLICATIONS

Girshick, R., et al., "Rich Feature Hierarchies for Accurate Object Detection and Semantic Segmentation," Tech Report (v5), 1-21 (2014).

International Preliminary Report on Patentability, dated Nov. 14, 2019, from International Application No. PCT/US2018/030405, filed on May 1, 2018. 9 pages.

Suzuki, L., et al. "Hidden Presence: Sensing Occupancy and Extracting Value from Occupancy Data," LNCS, 9188: 412-424 (2015).

* cited by examiner

| occupancy table 107 | |
|---|---|
| camera ID 22 | occupancy information 20 |
| 124 | occupancy information 20-124 — 29-1 |
| 126 | occupancy information 20-126 — 29-2 |
| 128 | occupancy information 20-128 — 29-3 |
| 130 | occupancy information 20-130 — 29-4 |

FIG. 5

| | | from object table | | from bounding box table | | | |
|---|---|---|---|---|---|---|---|
| object ID | object type | region of interest ID | region of interest label | bounding box list | isOccupied | people count | timestamp |
| 50-1 | chair | 90-1 | chair_1 | n/a | FALSE | 0 | 2018-04-15-01 23:30:00 |
| 50-2 | chair | 90-2 | chair_2 | n/a | FALSE | 0 | 2018-04-15-01 23:30:00 |
| 50-3 | chair | 90-3 | chair_3 | 128-4 | TRUE | 1 | 2018-04-15-01 23:30:00 |
| 50-4 | chair | 90-4 | chair_4 | n/a | FALSE | 0 | 2018-04-15-01 23:30:00 |
| 50-5 | chair | 90-5 | chair_5 | n/a | FALSE | 0 | 2018-04-15-01 23:30:00 |
| 42-1 | desk | 90-6 | desk_1 | 28-2, 28-3 | TRUE | 2 | 2018-04-15-01 23:30:00 |
| 42-2 | desk | 90-7 | desk_2 | 28-4 | TRUE | 1 | 2018-04-15-01 23:30:00 |
| 8 | room | 90-8 | room_1 | 28-1, 28-2, 28-3, 28-4 | TRUE | 4 | 2018-04-15-01 23:30:00 |
| 50-1 | chair | 90-1 | chair_1 | n/a | FALSE | 0 | 2018-04-15-01 23:30:01 |
| 50-2 | chair | 90-2 | chair_2 | n/a | FALSE | 0 | 2018-04-15-01 23:30:01 |
| 50-3 | chair | 90-3 | chair_3 | 28-4 | TRUE | 1 | 2018-04-15-01 23:30:01 |

FIG. 6

SPACE MANAGEMENT MONITORING AND REPORTING USING VIDEO ANALYTICS

RELATED APPLICATIONS

This application is a § 371 National Phase Application of International Application No. PCT/US2018/030405, filed on May 1, 2018, now International Publication No. WO 2018/204332 A1, published on Nov. 8, 2018, which International Application claims the benefit under 35 USC 119(e) of U.S. Provisional Application No. 62/492,426, filed on May 1, 2017, both of which are incorporated herein by reference in their entirety.

BACKGROUND OF THE INVENTION

Surveillance systems are used to help protect people, property, and reduce crime for homeowners and businesses alike and have become an increasingly cost-effective tool to reduce risk. These systems are used to monitor buildings, lobbies, entries/exits, and secure areas within the buildings, to list a few examples. The surveillance systems also identify illegal activity such as theft or trespassing, in examples. The surveillance systems typically include components such as surveillance cameras, access control systems, and video analytics systems.

In these surveillance systems, surveillance cameras capture image data of scenes. The image data is typically represented as two-dimensional arrays of pixels. The cameras include the image data within streams, and users of the system such as security operators view the streams on display devices such as video monitors.

Modern surveillance systems with video analytics capabilities provide the ability to detect and track individuals and objects within monitored scenes. These video analytics systems can provide both live monitoring of individuals, and forensic analysis of saved image data to spot trends and search for specific behaviors of interest.

Access control systems in buildings, for example, are principally concerned with physical security and the selective access to, restriction of, and/or notification of access to a place or other resource. Historically, the main components of the access control systems were access control readers and possibly door controllers.

The access control readers were often installed to enable presentation of credentials to obtain access to restricted areas, such as buildings or areas of the buildings. The readers were installed near access points, such as doors or hallways or elevators. Typically, individuals would interact with the access control readers by swiping keycards or bringing contactless smart cards within range (approximately 2-3 inches or 5 centimeters) of the reader. The access control readers would read the credential information of the keycards and validate the information possibly by reference to a verification system that confirmed the credentials and determined if the individuals were authorized to access the restricted areas. If the individuals were authorized, then the access control readers might signal the door controller to unlock doors or not generate alarms, for example.

There are other examples of building management systems such as building automation systems, fire alarm systems, and security systems. In general, these building management systems include one or more control panels or controllers connected to distributed devices positioned throughout the building. The distributed devices generally include combinations of sensors, user interfaces, and actuators. The sensors detect conditions throughout the premises and send data or analog signals to the control panels indicating the conditions. User interfaces display information and receive input from users of the systems. Actuators perform physical operations to control the environment of the premises.

Building automation systems will typically include one or more building automation control panels and distributed devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. HVAC systems typically include air handlers and systems of ducts and vents for circulating air throughout the building. Business-specific systems include computer systems, manufacturing systems that include various types of computer-aided machinery and test equipment, and inventory control and tracking systems, in examples. Sensors for building automation systems include, for example, temperature sensors, light sensors, humidity sensors, volatile organic compound (VOC) sensors. User interface elements for building automation systems might include touchscreen displays (for example, as part of a thermostat or other indicator). Actuators for building automation systems include dampers, chillers, smart lighting systems, motorized shades, and other mechanical equipment, to list a few examples.

Security systems typically include intrusion control panels and their own distributed devices. The distributed devices detect indications of intrusions, building security breaches and unauthorized access at or within the building and report to the intrusion panels. Security distributed devices include sensors such as motion sensors, door and window relays, and thermal sensors that communicate with the intrusion panel over a security network. Motion sensor devices can detect intrusions and unauthorized access to the premises, and send indications of the intrusions to the security panel. The surveillance camera devices capture video data of monitored areas within the premises, in examples.

Fire alarm systems typically include fire control panels that function as system controllers. Distributed devices for fire alarm systems include fire detection/initiation sensors such as smoke detectors, carbon monoxide detectors, flame detectors, temperature sensors, and/or pull stations (also known as manual call points), fire notification user interface elements such as speakers, horns, bells, chimes, light emitting diode (LED) reader boards, and/or flashing lights (e.g., strobes), and actuators such as fire suppression systems. The fire detection devices monitor the buildings for indicators of fire. Upon detection of an indicator of fire such as smoke or heat or flames, the distributed device is activated and a signal is sent from the activated distributed device to the fire control panel. The fire control panel then initiates an alarm condition by activating audio and visible alarms of the fire notification devices of the fire alarm system and activating fire suppression systems, which are also distributed around the building. Additionally, the fire control panel will also send an alarm signal to a monitoring station, which will notify the local fire department or fire brigade.

Generally, control panels and distributed devices of building management systems communicate over a wired and/or wireless network using various communications protocols. However, some distributed devices do not connect directly to the network and instead connect to input-output blocks, which provide an interface for these devices to communicate with, for example, the control panels on the network. These input-output blocks can be part of the control panels or standalone relay devices.

Space management involves the management of an organization's physical, office space inventory within buildings. The office space can include entire floors of buildings, one or more rooms/offices within buildings, or even areas within rooms.

Office space in many organizations involves an enormous cost, especially in large cities and urban areas such as London, Manhattan, and Singapore, in examples. In recent years, this office space situation has led to concepts such as 'hot desking, where employees share physical work spaces.

SUMMARY OF THE INVENTION

It would be beneficial to provide a building occupancy monitoring system that can accurately and cost effectively monitor usage of work spaces and other areas in buildings used by individuals, and report details of this usage and usage changes over time. Such a system could also more generally monitor building resources used or accessed by individuals. Building resources include rooms (e.g., conference rooms) within a building, areas such as work areas and offices, and objects such as desks, chairs, and tables within the rooms/areas. Building resources can also include office equipment such as computers, printers, and phones in the rooms or areas, or located on top of the desks, in other examples.

In general, according to one aspect, the invention features a building occupancy monitoring system. The system includes an image analytics module that tracks individuals in image data from surveillance cameras relative to building resources, and an occupancy report module. The occupancy report module generates occupancy information including building resources that are used/unused by the individuals.

The present invention takes advantage of the presence of video surveillance equipment to provide occupancy data and reporting.

The proposed system can also be used to control a building automation control system, based upon occupancy information collected over time. The occupancy information collected over time includes utilization of rooms, and the building automation control system sends signals in accordance with the room utilization to a heating/ventilation/air conditioning system (HVAC).

Further, the occupancy information can be correlated by the occupancy report module to access control card swipes information provided by an access control system.

In examples, the occupancy report module generates motion maps to visualize how people flow through the building over given periods of time and generates dwell maps to visually show where people spend most time.

The system might also include an access control system or other building management system and a display. The access control system receives the motion maps and dwell maps from the occupancy report module. The display displays the motion maps and/or dwell maps, possibly for guiding people to unused building resources.

In addition or in the alternative, these motion maps and/or dwell maps and/or occupancy information can be sent to other building management systems including the heating, ventilation, and air conditioning (HVAC) systems, elevators/ escalators, lighting and power systems, refrigeration and coolant systems, fire alarm systems and security systems and then displayed or used in the operation of those systems.

In one implementation, the image analytics module identifies the building resources during a configuration process. The image analytics module also generates bounding boxes for tracking the individuals in the image data.

In examples, the building resources include rooms, areas of the rooms, and desks and chairs within the rooms and areas.

In general, according to another aspect, the invention features a method for monitoring occupancy in a building. The method includes tracking individuals in image data from surveillance cameras relative to building resources, and generating occupancy information including building resources that are used/unused by the individuals.

In one implementation, the method identifies the building resources using deep learning. Typically, tracking the individuals includes generating bounding boxes for the individuals in the image data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 5 is a block diagram showing detail for an exemplary implementation of the occupancy table within the space management database;

FIG. 6 is a block diagram showing detail for an exemplary implementation of occupancy information stored within the occupancy table, where the occupancy information is created in accordance with the method of FIG. 4, for the scene depicted in FIG. 2;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
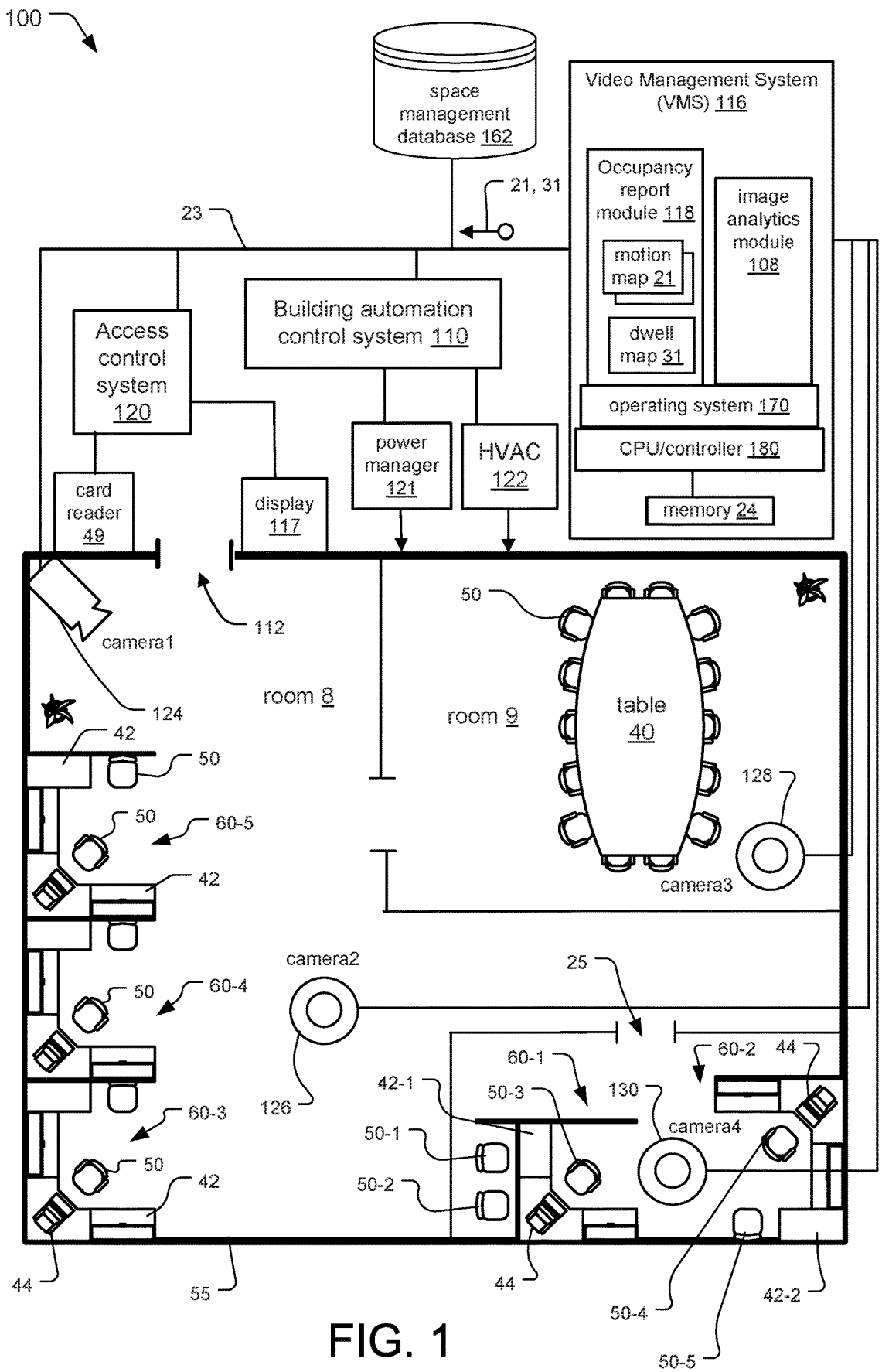
FIG. 1 is a schematic block diagram of a building occupancy monitoring system (system) constructed in accordance with principles of the present invention, where rooms and areas of a building monitored by the system are also shown.

FIG. 1 is a block diagram of a building occupancy monitoring system (system) 100 that tracks individuals and monitors different areas and rooms of a building 55, such as rooms 8 and 9.

The system 100 includes various components. The system 100 includes surveillance cameras 124, 126, 128, and 130 located within rooms 8, 9 of the building 50, a video management system (VMS) 116, a space management database 162, a building automation control system 110, and an access control system (ACS) 120. The components communicate over a local network 23.

The VMS 116 includes an operating system 170, a central processing unit (CPU)/controller 180, memory 24, and applications. In one embodiment, as shown in the figure, the applications of the VMS 116 include an image analytics module 108 and an occupancy report module 118.

In the system 100, the image analytics module 108 tracks individuals in image data from the surveillance cameras, relative to building resources. The occupancy report module 118 generates occupancy information including building resources that are used/unused by the individuals.

The applications of the VMS 116 such as the image analytics module 108 and occupancy report module 118 execute on the CPU 180 with the support of the operating system 170. The operating system 170 loads the executable instructions of the modules 108/118 into memory 24 with the assistance of various computer libraries. The operating system 170 then schedules the modules 108, 118 for execution on the CPU 180.

In another embodiment, the image analytics module 108 and occupancy report module 118 could also be applications within a computer system or server that is separate from the VMS 116. The separate computer system or server also has an operating system, one or more CPUs/controllers, and memory. The modules 108/118 execute on the CPUs of these systems with the support of its operating system and in conjunction with memory in a substantially similar fashion as that described herein above for the VMS 116.

In other embodiments, the modules 108/118 each might also be applications executing on CPUs of different computer systems, or be implemented within the surveillance cameras 124, 126, 128, 130.

In general, the surveillance camera(s) 124, 126, 128 and 130 capture image data of scenes within fields of view of the cameras and send the image data to the VMS 116. The cameras are either wired to the VMS 116, as shown, or are wirelessly connected to the VMS via a wireless access point. The cameras 124, 126, 128, and 130 are also respectively labeled as camera1, camera2, camera3, and camera4.

The VMS 116 stores the image data from the cameras to the space management database 162. Typically, time and date information in the form of timestamps are added by the VMS 116 or by the modules 108/118 to the image data. This enables the image data to be indexed and reviewed at a later date.

The image analytics module 108 tracks locations and movements of individuals. For this purpose, the image analytics module 108 analyzes the image data such as by maintaining background model and then using that model to track foreground objects such as individuals. It then generates bounding boxes to track the individuals as they move across the image data of the scene of each camera.

The image analytics module 108 also identifies objects within the image data of each camera, relative to a background model of the scene. These objects include static elements within the scene such as doors/doorways, chairs, tables, and desks, in examples. The image analytics module 108 may also associate metadata to moving objects (e.g., people), numbers of moving objects, and specific users, to list a few examples.

The image analytics module 108 might preferably further implement tripwire processing. This enables the analytics module 108 to determine when individuals cross the tripwire, and to generate metadata concerning the crossing, in examples.

The space management database 162 stores various information for the system 100. This information includes the occupancy information generated by the occupancy report module 118, the image data from the cameras, the bounding box information generated by the image analytics module 108, and object data for the objects identified by the image analytics module 108. The object data also includes regions of interest that operators of the system define around the building resources/objects within the scene as part of a configuration process.

The ACS 120 controls components mounted near access points 112 such as doors. The access points are located near rooms and control access to the rooms 8,9. The components controlled by the ACS 120 include a card reader 49 and a display 117.

The building automation control system 110 controls a power manager 121 and a heating/ventilation/air conditioning system (HVAC) 122. The power manager 121 enables/disables input power to office equipment in the rooms such as computers, printers, and telephones, in examples. The building automation control system 110 is one example of a building management system for monitoring and controlling mechanical and electrical equipment in buildings 55. Other examples include fire alarm systems, security systems, elevator control systems, and lighting and power control systems.

As shown, the surveillance camera(s) 124, 126, 128 130 are installed in rooms 8,9 such as meeting rooms, and within or near areas such as offices 25 and work areas 60. A single camera 128 could monitor most meeting rooms 9.

In more detail, in the illustrated example, a dome camera 124 might be located in room 8. Additionally, in another part of the room 8, a fisheye (ultra wide angle) camera 126 is further installed on the ceiling. The cameras 124, 126 monitor work areas 60-3, 60-4, and 60-5.

Each of the work areas 60-3, 60-4, 60-5 include one or more chairs 50 at desks 42. The desks can be "sit down" desks or portable standing desks, in examples. The desks 42, in turn, typically have office equipment placed upon the desks such as computers 44, printers, and telephones, in examples.

At the same time, in another room 9, such as a conference or meeting room, a fisheye camera 128 is installed. The room 9 includes a table 40 and multiple chairs 50 at the table 40.

An office 25 is also within room 9. In the office 25, another fisheye camera is installed 130. The office 25 includes work areas 60-1 and 60-2. Work area 60-1 includes desk 42-1, and chairs 50-1, 50-2, and 50-3 at the desk 42-1. A computer 44 is placed upon the desk 42-1. In a similar vein, work area 60-2 includes desk 42-2, and chairs 50-4 and 50-5 at the desk 42-1. A computer 44 is also placed upon desk 42-2.

The occupancy report module 118 generates occupancy information for the building resources in the building 55. In examples, the occupancy information includes people counts within rooms 8,9 of the building 55 determined over time, and whether persons are using building resources within the rooms. When the occupancy report module 118 determines that persons are present in the scene relative to a building resource or object at a point in time, that building resource or object is said to be utilized or occupied at that point in time.

The occupancy report module 118 also generates motion maps 21 and dwell maps 31 based upon the occupancy information. Typically, the module 118 generates the motion maps 21 from image data of the fisheye cameras in conjunction with the occupancy information. Motion maps provide a simple way to visualize how people 'flow' through areas of a building over given periods of time. The dwell maps 31, in contrast, visually show where people spend most time.

The image analytics module 108 also creates alerts based on the absence of motion (or presence) in the image data from the cameras. This image data is then analyzed by the occupancy report module 118 to determine if a building resource such as a desk, table, seat, room 8,9 or area (e.g. work area 60, office 25) has been unused for a period of time, in one example.

The alerts provided by the image analytics module 108 are further used by the occupancy report module 118 to generate reports. The reports can be sent to end users, and to components such as the ACS 120 and the building management control system 110. These reports can be used to display the utilization of building resources within the building 55, in one example. One example report might include details concerning meeting room utilization and usage of hot desking building resources such as desks 42 and chairs 50 in work areas 60. The reports generated by the occupancy report module 118 can also include the motion maps 21 and the dwell maps 31.

As a result, the occupancy information (and reports based upon the occupancy information) can provide valuable insight into how and to what extent building resources are being used in a building 55 over time.

The occupancy report module 118 also passes the occupancy information to the building automation control system 110. Based on the received occupancy information, in one example, the control system 110 can send control signals, via BACnet, for example, to the HVAC system 122 to adjust climate/temperature for the rooms 8, 9. For this purpose, the building automation control system 110 can access people counts within the occupancy information for the rooms that the control system 110 controls. Based upon the people counts in each room, the control system 110 can then send control signals to accordingly adjust the temperature in these rooms.

The occupancy report module 118 provides a further enhancement to the system 100. The module 118 can correlate the occupancy information to access control card swipes information provided by the ACS 120 to further improve accuracy of or to detect anomalies in the occupancy information.

In yet another embodiment, the system 100 also includes camera based pixel motion detection. Such motion detection can detect motion of individuals relative to building resources, in one example. As a result, the system 100 can use motion detection, video analytics, or video analytics in conjunction with motion detection to generate motion maps 21 and dwell maps 31, and to generate occupancy information for detecting the presence of individuals and determining utilization of space/building resources within buildings 55.

It can also be appreciated that the system 100 can incorporate deep learning capabilities. In one embodiment, the VMS 116 includes a deep learning application/module that can identify and classify the building resources. The deep learning application executes on the CPU 180 in a similar fashion as the modules 108/118. The deep learning application can either augment the manual configuration step of defining regions of interest 90 around/relative to building resources in image data of the scene, or possibly eliminate this manual configuration step. In this way, the occupancy report module 118 can generate occupancy information based upon movement and location of individuals relative to building resources identified within the scene by the deep learning application.

Figure 2:
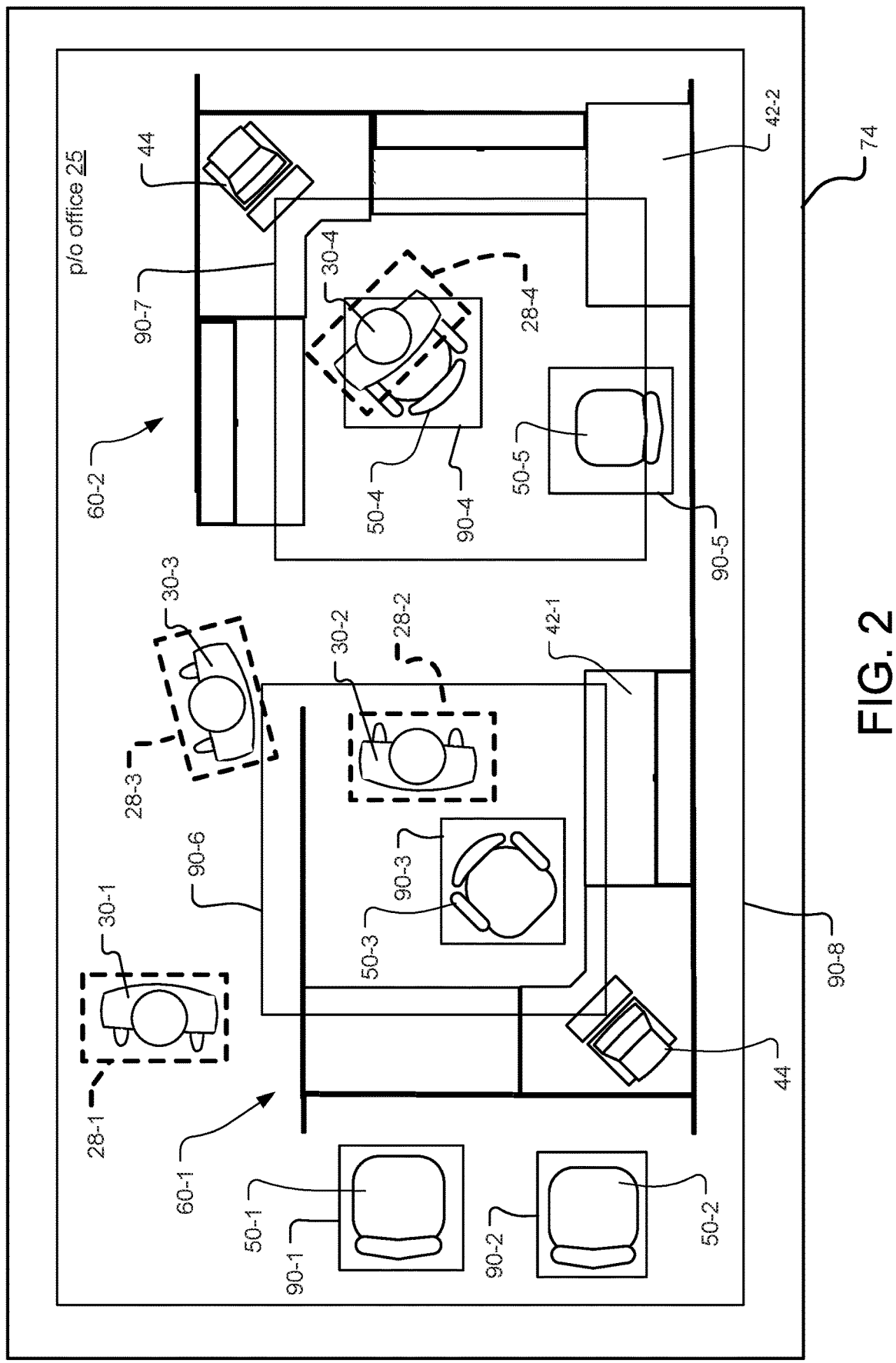
FIG. 2 is a representation of image data of a scene captured by a surveillance camera in FIG. 1 and analyzed by the image analytics module, where the scene includes an office of a room within the building, and where locations of individuals relative to building resources such as desks, chairs, and areas within the room are also shown.

FIG. 2 is a representation of image data of a scene captured by a surveillance camera in FIG. 1. The figure is an in-memory representation of what camera4 130 in FIG. 1 "sees" in its field of view and the image analytics applied by the analytics module 108. The scene is of office 25 in room 8.

A representative frame of image data 74 from camera 130 is shown. In one implementation, objects such as work areas 60, chairs 50 and desks 42 are identified within the scene by the image analytics module 108.

In another implementation, objects such as work areas 60, chairs 50 and desks 42 are identified to analytics module 108 as part of an initial configuration step or process. For example, an operator of the system 100 draws regions of interest 90 around objects (specifically, around building resources) and categorizes them for the analytics module 108). The operator draws the regions of interest 90 so that the analytics module can then track foreground objects, such as individuals relative to these objects. This information is then sent to the occupancy report module 118.

In the illustrated example, regions of interest 90-1 through 90-5 are drawn around building resources such as chairs 50-1 through 50-5, and regions of interest 90-6 and 90-7 are drawn around desk building resources such 60-1 and 60-2. Region of interest 90-8 is also drawn around the entirety of the scene.

Bounding boxes 28 for individuals/persons 30 within the scene are also shown. Bounding boxes 28-1 through 28-4 respectively track individuals 30-1 through 30-4.

In general, the occupancy report module 118 determines that a building resource or area is "occupied" when bounding boxes of one or more individuals intersect the region of interest 90 for that building resource or area. A count of persons can also be obtained by the occupancy report module 118 for building resources or areas, based on the number of bounding boxes 28 that intersect with those building resources or areas, in one example.

In another implementation, a deep learning application identifies and classifies the objects/building resources in the scene. Here, the occupancy report module 118 might determine the occupancy information for the building resources, without the need for the operator to manually configure the regions of interest 90 around the building resources in the scene.

Figure 3:
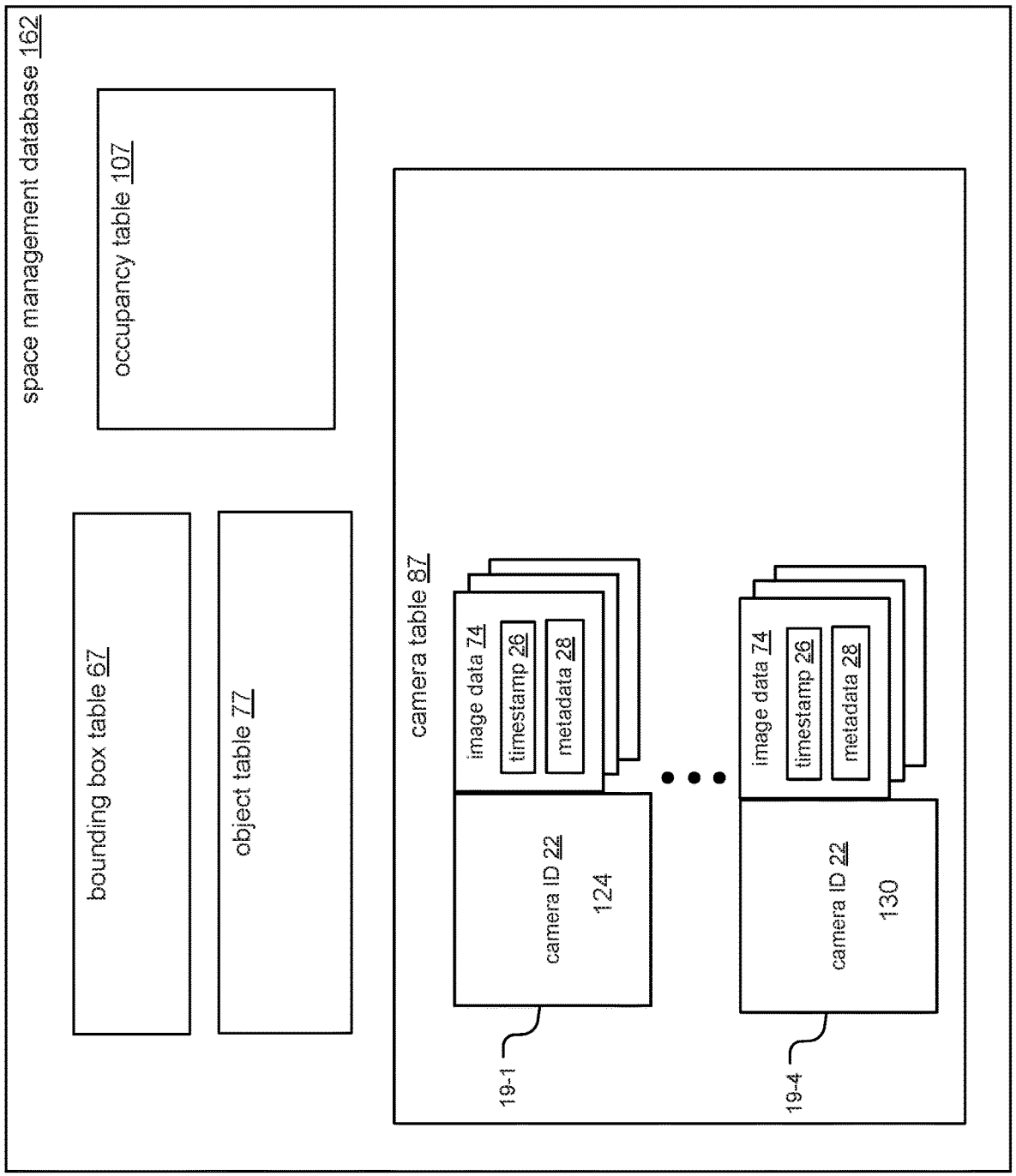
FIG. 3 is a block diagram showing different tables within a space management database of the system.

FIG. 3 is a block diagram showing different tables within the space management database 162. A bounding box table 67, object table 77, occupancy table 107, and camera table 87 are shown.

Image data 74 for each of the cameras 124, 126, 128, and 130 are stored to the camera table 87. Each row 19 stores a camera ID and the image data 74 for each camera. Exemplary rows 19-1 and 19-2 are shown for cameras 124 and 130. Each instance of image data 74 includes a timestamp 26 and metadata 28.

The modules 108, 118 also store information to other tables in the space management database 162. Tracking data for individuals is stored to the bounding box table 87. The tracking data at least includes bounding boxes 28 for individuals 30. Objects/building resources identified by the image analytics module 118 are stored to the object table 77. Occupancy information determined and generated by the occupancy report module 118 are stored to the occupancy table 107.

Figure 4:
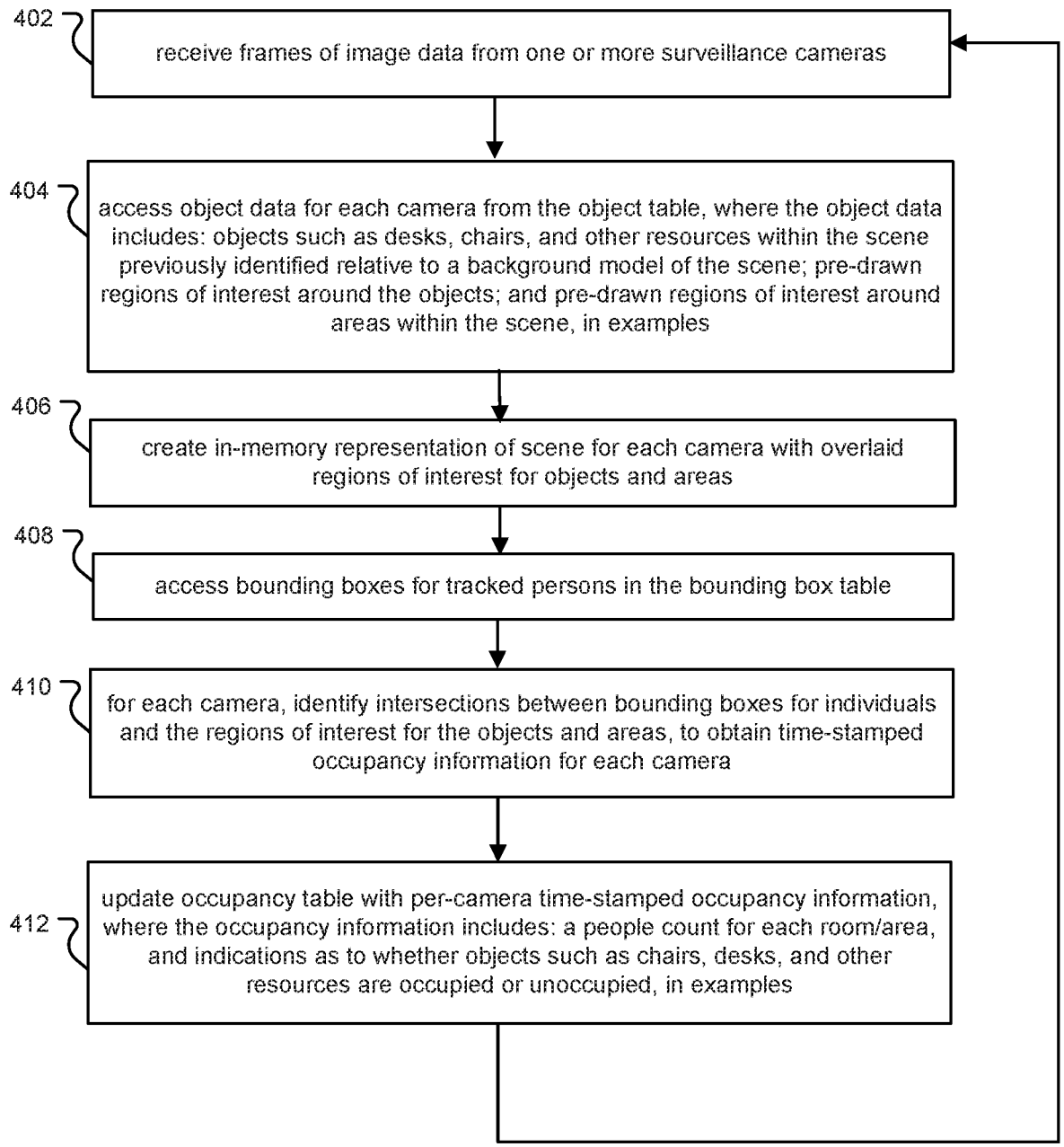
FIG. 4 is a flow chart showing a method of operation for an occupancy report module of the system, where the method describes how the occupancy report module continuously generates occupancy information for building resources in a building over time, and populates an occupancy table of the space management database with the occupancy information.

FIG. 4 is a flow chart showing a method of operation of the occupancy report module 118. The method shows how the module 118 generates occupancy information, and then populates the occupancy table 107 with the occupancy information.

In step 402, the occupancy report module 118 receives image data 74 from one or more surveillance cameras 124, 126, 128, 130. In the embodiment of FIG. 1, for example, the VMS 116 receives "live" image data sent from the cameras, or accesses stored image data 74 of the cameras in the camera table 87. The VMS 116 then provides the image data 74 to the report module 118.

According to step 404, the module 118 accesses object data for each camera from the object table 77. In examples, the object data includes: objects such as desks, chairs, and other building resources within the scene, previously identified relative to a background model of the scene; pre-drawn regions of interest 90 around the objects; and pre-drawn regions of interest 90 around areas within the scene, in examples.

In step 406, the module 118 creates an in-memory representation of the scene for each camera, with overlaid regions of interest 90 for objects and areas from the object table 77. Then, in step 408, the occupancy report module 118 accesses bounding boxes 28 for tracked individuals 30 in the bounding box table 67.

For each camera, in step 410, the module 118 identifies intersections between the bounding boxes 28 for individuals 30 and the regions of interest 90 for the objects and areas, to obtain time-stamped occupancy information for each camera. In step 412, the module 118 updates the occupancy table 107 with per-camera time-stamped occupancy information. In examples, the occupancy information includes: people counts for each room and area of the room (e.g. work area), and indications as to whether objects such as chairs, desks, and other building resources are occupied or unoccupied, in examples.

Upon completion of step 412, the method transitions to the beginning of step 402 to access new/additional frames of image data 24 from the cameras 124, 126, 128, 130.

FIG. 5 is a block diagram showing detail for the occupancy table. This figure shows one way of storing/representing occupancy information 20 generated by the occupancy report module 118.

In a preferred embodiment, an operator configures the system 100 such that its cameras each include one room of the building 55 within their field of view. In this way, occupancy information 20 for rooms (and objects/building resources within the rooms) can be associated with individual cameras. Specifically, in the implementation shown, occupancy information 20 is stored on a per-camera basis and indexed by the camera ID for that camera.

In more detail, each of the rows 29-1 through 29-4 include a camera ID 22 and occupancy information 20. Each of the cameras capture image data 74 of an individual room or area of a room, and the occupancy information 20 is associated with/generated for building resources identified in the image data 74 for that room or area of the room. In more detail, row 29-1 stores occupancy information 20-124 for camera1/124; row 29-2 stores occupancy information 20-126 for camera2/126; row 29-3 stores occupancy information 20-128 for camera3/128; and row 29-4 stores occupancy information 20-130 for camera 4/130.

FIG. 6 is a block diagram showing detail for an exemplary implementation of occupancy information 20-130 in FIG. 5.

The occupancy information 20-130 includes information concerning occupancy/usage of individual building resources in office 25 of room 8, based upon analysis of image data 74 from camera4/130, in the occupancy information 20-130, a separate row 39 is created for each building resource/object identified in each time-stamped frame of image data 74.

Each row 39 includes the timestamp for each frame of image data 24, and groupings of related fields. The groupings include object-related fields from the object table 77, bounding box-related fields from the bounding box table 67, and occupancy-related fields. The module 118 calculates values for the occupancy-related fields in each row, based upon analysis of the object-related fields and bounding box-related fields in that row. The object-related fields and bounding box-related fields also enable additional lookup of information in the object table 77 and bounding box table 67.

In more detail, the fields within each row 39 are as follows. The bounding box-related fields include a bounding box list. The bounding box list for each row 39 includes a list of bounding boxes 28 of individuals 30 that the module 118 has identified as intersecting with the region of interest 90 for the object/building resource represented by each row 39. The object-related fields include: an object ID for each object, which is also an index for each row; an object type; a region of interest ID; and a region of interest label. The occupancy-related fields include an "isOccupied" and a "peopleCount" field, in examples. The timestamp field indicates a date and time, often in "yyyy:mm:dd hh:mm:ss" format. Timestamps having more granularity (e.g. in hundreds or possibly in tens of milliseconds) are also possible.

Such a representation of data enables the following occupancy-related information to be calculated/generated for each building resource. In one example, for each time-stamped frame of image data 74, the occupancy report module 118 can calculate the count of people (e.g. the "peopleCount" field) that are occupying/using each object or building resource at the time indicated by the timestamp. In another example, the module 118 can also provide an indication of whether each building resource is occupied or unoccupied at the time indicated by the timestamp (e.g. the "isOccupied" field). This information can then be aggregated over time to spot trends in utlization/lack of utilization of each building resource.

The rows 39 in the table are then continuously populated/updated as new timestamped image data 74 from each camera arrives from the cameras or is obtained from the camera table 87.

By way of example, also with reference to FIG. 2, rows 39-1 through 39-8 are populated by the occupancy report module 118 with specific values for the fields in each row. Each row 39-1 through 39-8 is populated for an instance of image data 74 from camera 130 having timestamp "2018-04-15-01 23:30:00." Rows 39-1 through 39-5 store occupancy information for chair building resources 50-1 through 50-5; rows 39-6 and 39-7 store information for desk building resources 42-1 and 42-2; and row 39-9 stores information for room building resource 8.

Row 39-1, in one example, has values of 0 and FALSE for its peopleCount and isOccupied fields, respectively. This is because a bounding box for an individual 30 did not intersect region of interest 90-1 for chair object 50-1 in FIG. 2. In another example, row 39-3 has values of 1 and TRUE for its peopleCount and isOccupied fields. This is because bounding box 28-2 for individual 30-2 intersected region of interest 90-2 for chair object 50-2 in FIG. 2. In yet another example, row 39-6 has values of 2 and TRUE for these respective fields. This is because bounding boxes 28-2 and 28-3 for individuals 30-2 and 30-3 both crossed region of interest 90-6 for desk building resource 42-1 in FIG. 2.

Rows 39-9 through 39-11 show the beginning of a pattern for calculation of occupancy information over time. Rows 39-9 through 39-11 show occupancy related information determined for the same objects/building resources 50-1, 50-2, and 50-3 in rows 39-1 through 39-3, respectively, for the next time-stamped frame of image data 74. Here, the next frame of image data has timestamp "2018-04-15-01 23:30:01," or one second later that that in rows 39-1 through 39-8.

In this way, the occupancy report module 118 can access rows 39 for the same objects/building resources in the occupancy information 20 over time to determine whether the resources are being used, how long they are used, and to spot trends in the usage, in examples. Reference or label A, for example, points to rows 39-1 and 39-9 for the same chair building resource 50-1 over a one second interval, for illustration purposes. However, it can be appreciated that the occupancy report module 118 can generate and analyze occupancy information over possibly hours, weeks, or months for each object or building resource.

Figure 7:
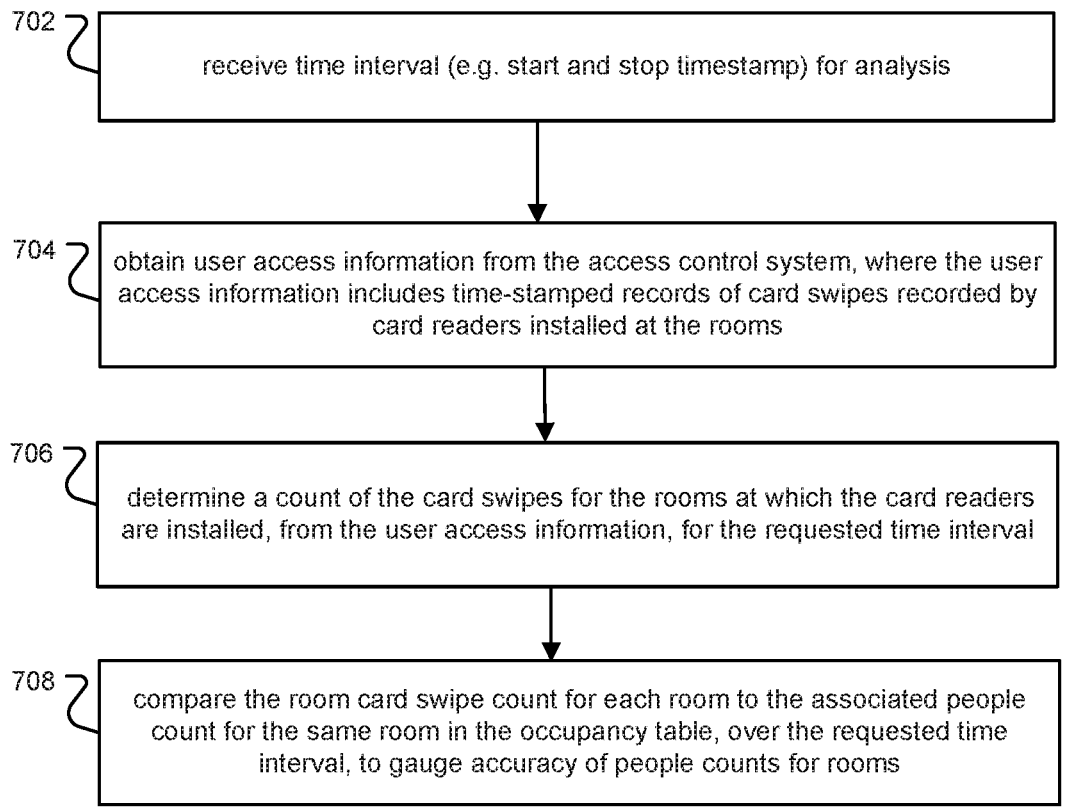
FIG. 7 is a flow chart showing another method of operation for the occupancy report module, where the method correlates card swipe counts for rooms obtained by card readers of an access control system (ACS), with occupancy information generated by the module for the same rooms.

FIG. 7 is a flow chart showing a method of the occupancy report module 118. The method correlates card swipe counts for rooms 8,9 with occupancy information 20 generated and stored for the same rooms within the occupancy table 107.

In step 702, the module 118 receives a time interval (e.g. start and stop timestamp) over which to execute the analysis. This interval can be defined as part of a request message issued to the module 118 by an operator of the system 100, in one example. According to step 704, the module 118 obtains user access information from the ACS 120. In one example, the user access information includes time-stamped records of card swipes recorded by card readers 49 installed at the rooms 8/9.

In step 706, the occupancy report module 118 determines a count of the card swipes for the rooms at which the card readers 49 are installed, from the user access information, for the requested time interval. The module 118 in step 708 then compares the room card swipe count for each room, to the associated people count (e.g. peopleCount field) of the occupancy information 20 for the same room in the occupancy table 107 over the requested time interval. In this way, the system 100 can gauge accuracy of people counts for rooms determined by the occupancy report module 118.

Figure 8:
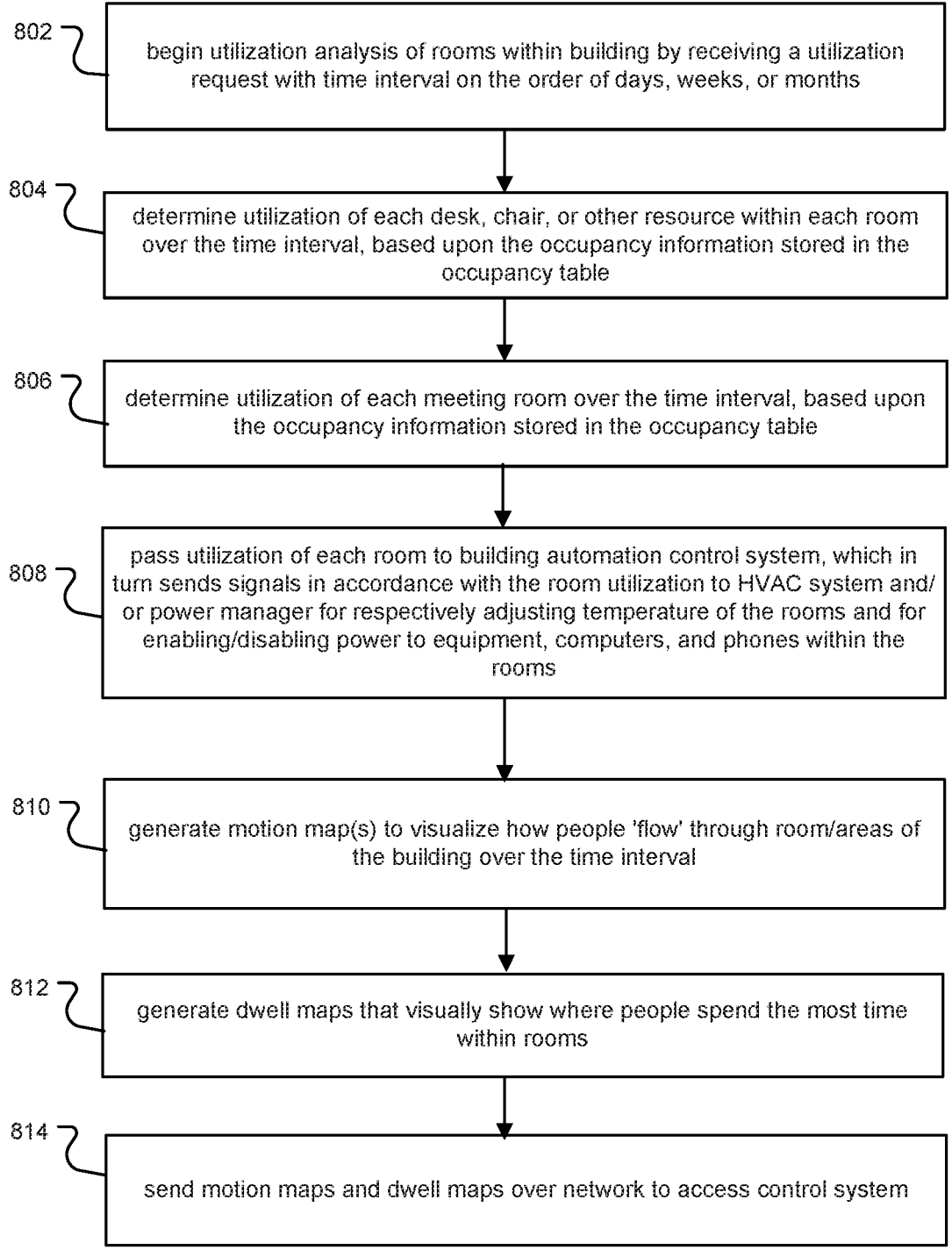
FIG. 8 is a flow chart showing yet another method of operation for the occupancy report module, where the method shows how the module provides occupancy information of rooms determined over time as input to a building automation control system, shows that the module generates dwell maps and motion maps, and sends the maps to the ACS.

FIG. 8 is a flow chart showing another method of operation for the occupancy report module 118. This method shows how occupancy information 20 collected over time (such as over days, weeks, or months) can spot utilization trends within rooms. In one example, reports that include these utilization trends can then be sent to the building management control system 110 to program the control system 110. Motion maps 21 and dwell maps 31 can also be sent to the ACS 120.

In step 802, the module 118 begins utilization analysis of rooms 8,9 within building 55 by receiving a utilization request with a time interval on the order of days, weeks, or months. The request is typically sent in the form of a message from an operator of the system 100. In step 804, the module 118 determines the utilization of each desk 42, chair 50, or other resource within each room 8,9 over the requested time interval, based upon the occupancy information 20 stored in the occupancy table 107 for the time interval. According to step 806, the module 118 also determines utilization of each meeting room 8,9 over the time interval, based upon the occupancy information 20 stored in the occupancy table 107 for the time interval.

In step 808, the module 118 passes the utilization of each room 8,9 determined in step 806 to the building automation control system 110. The control system 110, in turn, sends signals in accordance with the room utilization to the HVAC system 122 and/or power manager 121 for respectively programming/adjusting temperature of the rooms 8,9 and for enabling/disabling power to office equipment such as computers, printers, and phones within the rooms. In another implementation, the module 118 can pass the utilization of each room to the control system 110 by passing the generated report that includes the utilization of each room.

In step 810, the module 118 generate motion map(s) 21 to visualize how people 'flow' through room/areas of the building 55 over the time interval. Also, the module generates dwell maps 31 that visually show where people spend the most time within rooms 8,9 in step 812. In step 814, the module 118 sends the motion maps 21 and dwell maps 31 over network 23 to the ACS 120.

Figure 9:
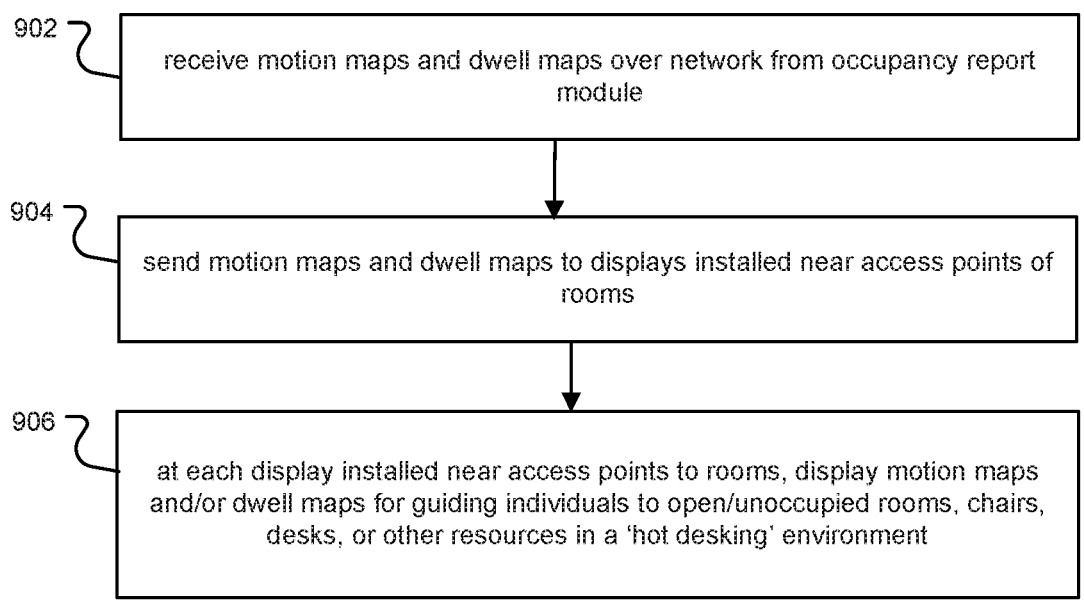
FIG. 9 is a flow chart showing a method of operation for an ACS of the building occupancy monitoring system, where the method shows that the ACS sends the dwell maps and motion maps for presentation on displays located near entrances to rooms.

FIG. 9 is a flow chart showing an exemplary method of operation for the ACS 120. The ACS 120 receives motion maps 21 and dwell maps 31 of rooms from the report module 118, and distributes the maps 21/31 to individuals seeking access to building resources in the rooms 8,9 as part of a hot desking system. The individuals are at access points 112 which enable access to the rooms.

In step 902, the access control system 120 receives motion maps 21 and dwell maps 31 over the network 23 from the occupancy report module 118. In step 904, the access control system 120 sends the motion maps 21 and dwell maps 31 to displays 117 installed near access points 112 of rooms. According to step 906, at each display installed near access points 112 to rooms 8/9, the motion maps 21 and/or dwell maps 31 are displayed to guide individuals to open/unoccupied rooms 8/9, chairs 50, desks 42, or other resources in a 'hot desking' environment.

It can also be appreciated that the occupancy report module 118 sends the occupancy information and maps 21/31 to systems and devices other than the access control system 120, in the various embodiments. In examples, the occupancy information and/or maps 21/31 can be sent to building management systems including the heating, ventilation, and air conditioning (HVAC) systems, elevators/escalators control system, lighting and power control systems, refrigeration and coolant control systems, fire alarm systems and security systems and then displayed or used in the operation of those systems.

In addition, the occupancy information and/or maps 21/31 is further sent to user devices carried by individuals, in these embodiments. User devices include mobile phones, tablets, and laptops, in examples. In one example, the user devices carried by the individuals have a display screen, upon which the occupancy information and maps 21/31 is displayed. For this purpose, an application or "app" executing on the user devices might register with the occupancy report module 118, where the occupancy report module 118 operates as an application server for a hot desking occupancy monitoring system. The individuals can then monitor and display the occupancy information and maps 21/31 on the user devices to determine if building resources in rooms and other areas of buildings 55 are available/unused.

While this invention has been particularly shown and described with references to preferred embodiments thereof, it will be understood by those skilled in the art that various changes in form and details may be made therein without departing from the scope of the invention encompassed by the appended claims.

What is claimed is:

1. A building occupancy monitoring system, comprising:
   at least one processor coupled with a memory; and
   the memory having processor-executable instructions stored therein for causing the at least one processor to:
   track one or more individuals in image data captured by surveillance cameras, and generate tracking information indicating a presence of the one or more individuals relative to a plurality of building resources; and
   generate occupancy information based on the tracking information, the occupancy information identifying the plurality of building resources that are used/unused by the one or more individuals and details concerning room utilization and usage of hot desking building resources by the one or more individuals, wherein the hot desking building resources include desks and chairs.

2. A system as claimed in claim 1, wherein the processor-executable instructions further cause the at least one processor to control building equipment based upon the occupancy information.

3. The system as claimed in claim 2, wherein the occupancy information collected over time includes room utilization information, and wherein the processor-executable instructions further cause the at least one processor to send signals in accordance with the room utilization information to an HVAC system and/or power manager for respectively adjusting temperature of one or more rooms and for enabling/disabling power to office equipment within rooms.

4. A system as claimed in claim 1, wherein the occupancy information is correlated to access control card swipe information provided by an access control system.

5. A system as claimed in claim 1, wherein the processor-executable instructions further cause the at least one processor to generate motion maps to visualize how people flow through a building over given periods of time.

6. A system as claimed in claim 1, wherein the processor-executable instructions further cause the at least one processor to generate dwell maps to visually show where people spend time.

7. A system as claimed in claim 1, wherein the processor-executable instructions further cause the at least one processor to:
   receive motion maps and dwell maps; and
   display the motion maps and/or the dwell maps.

8. A system as claimed in claim 1, wherein the processor-executable instructions further cause the at least one processor to identify the plurality of building resources during a configuration process.

9. A system as claimed in claim 1, wherein the processor-executable instructions further cause the at least one processor to generate bounding boxes for tracking the one or more individuals in the image data.

10. A method for monitoring occupancy in a building, the method comprising:
    generate tracking information indicating a presence of one or more individuals relative to a plurality of building resources by tracking the one or more individuals in image data captured by surveillance cameras; and
    generating occupancy information based on the tracking information, the occupation information identifying the plurality of building resources that are used/unused by the one or more individuals, and details concerning room utilization and usage of hot desking building resources by the one or more individuals, wherein the hot desking building resources include desks and chairs.

11. The method as claimed in claim 10, further comprising controlling a building automation control system based upon occupancy information collected over time.

12. The method as claimed in claim 11, wherein the occupancy information includes room utilization information, and further comprising sending signals, building automation control system, in accordance with the room utilization to an HVAC system and/or power manager for respectively adjusting temperature of rooms and for enabling/disabling power to office equipment within the rooms.

13. The method as claimed in claim 10, further comprising correlating the occupancy information to access control card swipe information provided by an access control system.

14. The method as claimed in claim 10, further comprising generating motion maps that visualize how people flow through the building over given periods of time.

15. The method as claimed in claim 10, further comprising generating dwell maps that visually show where people spend time.

16. The method as claimed in claim 10, further comprising:
   receiving motion maps and dwell maps based upon the occupancy information; and
   displaying the motion maps and/or the dwell maps for guiding people to unused building resources.

17. The method as claimed in claim 10, further comprising identifying the plurality of building resources during a configuration process.

18. The method as claimed in claim 10, further comprising identifying the plurality of building resources using a deep learning technique.

19. The method as claimed in claim 10, wherein tracking the one or more individuals includes generating bounding boxes for the one or more individuals in the image data.

20. A building occupancy monitoring system, comprising:
   at least one processor coupled with a memory: and
   the memory having processor-executable instructions stored therein for causing the at least one processor to:
      track one or more individuals in image data captured by surveillance cameras, and generate tracking information indicating a presence of the one or more individuals relative to a plurality of building resources; and
      generate occupancy information based on the tracking information, the occupancy information identifying the plurality of building resources that are used/unused by the one or more individuals, and details concerning room utilization and usage of hot desking building resources by the one or more individuals, wherein the hot desking building resources include desks and chairs;
      receive motion maps and dwell maps and distribute the motion maps and dwell maps to plurality of display devices, wherein the plurality of display devices are installed near access points that enable access to the plurality of building resources; and
      display, via the plurality of display devices, the motion maps and/or the dwell maps.

21. The building occupancy monitoring system as claimed in claim 1, wherein the processor-executable instructions further cause the at least one processor to track the one or more individuals relative to rooms, areas of the rooms, desks, and/or chairs, and generate the occupancy information to indicate the presence of the one or more individuals relative to the rooms, the areas of the rooms, the desks, and/or the chairs.

22. The building occupancy monitoring system of claim 1, wherein the processor-executable instructions further cause the at least one processor to transmit the occupancy information to an access point of a hot desking system.

23. The building occupancy monitoring system of claim 1, wherein the processor-executable instructions further cause the at least one processor to display the occupancy information on one or more user devices.

* * * * *